J. D. FARMER.
TWINE HOLDER.
APPLICATION FILED APR. 29, 1918.
1,290,149.
Patented Jan. 7, 1919.
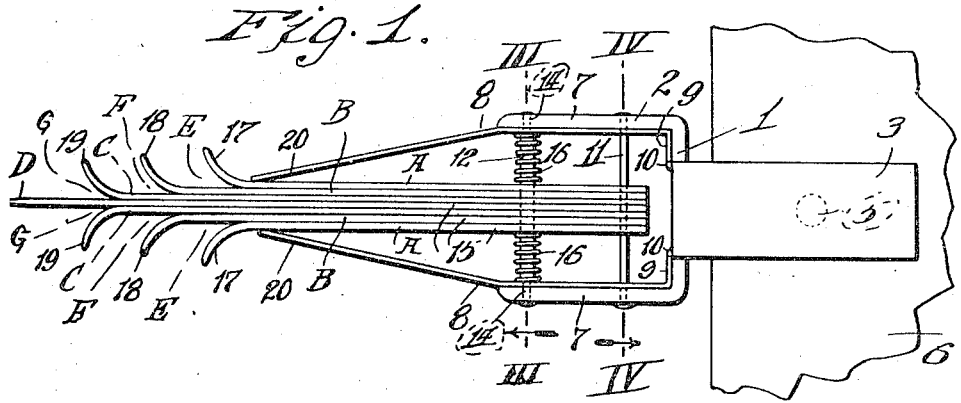
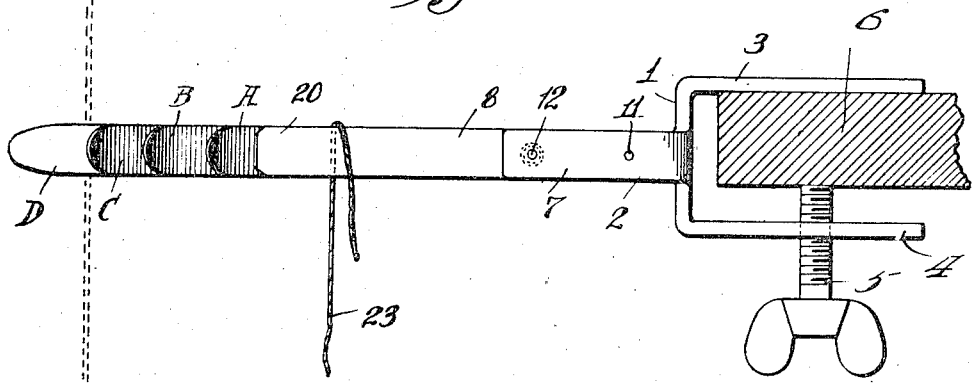
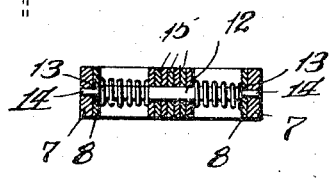
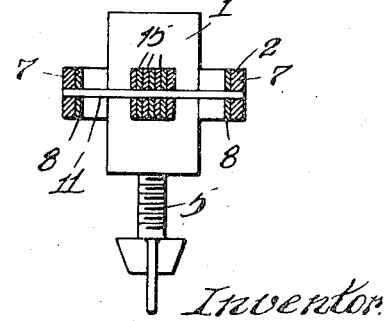
Inventor
James D. Farmer.
By I. G. Fletcher, atty.

UNITED STATES PATENT OFFICE.

JAMES D. FARMER, OF ST. LOUIS, MISSOURI.

TWINE-HOLDER.

1,290,149.   Specification of Letters Patent.   Patented Jan. 7, 1919.

Application filed April 29, 1918. Serial No. 231,295.

*To all whom it may concern:*

Be it known that I, JAMES D. FARMER, a citizen of the United States of America, and a resident of the city of St. Louis and State of Missouri, have invented certain new and useful Improvements in Twine-Holders, of which the following is a specification.

This invention relates to an improved twine holder, and has for its primary object the provision of improved means whereby lengths of twine that are taken from wrapped bundles from which they have been used, can be readily engaged by a plurality of resiliently mounted retaining fingers when the lengths of twine are engaged thereagainst.

Another object is to provide an improved twine holder of such a construction which will provide for the lengths of twine depending therefrom in approximately perpendicular positions, so that the lengths of twine can be readily disengaged singly from the holder when it is desired to use the twine for wrapping purposes.

Other and further objects will appear in the specification and be specifically pointed out in the appended claims, reference being had to the accompanying drawings exemplifying the invention, and in which, Figure 1 is a plan view of this improved twine holder showing it attached to a ledge or other handy place.

Fig. 2 is a side elevation of Fig. 1, the attaching ledge being shown in section.

Fig. 3 is a transverse section taken on the line III—III of Fig. 1.

Fig. 4 is a transverse section taken on the line IV—IV of Fig. 1.

With reference to the accompanying drawings, 1 designates a body member on which are formed a horizontally arranged jaw 2 and vertically arranged jaw 3, said jaw 3 serving as the clamping jaw and the lower lip 4 thereof bearing a clamping screw 5 which is adapted to engage the ledge 6.

Located against each of the legs 7 of the jaw 2 is a leaf spring 8, each of said springs having an angular bent end 9, the ends of which bear against lugs 10 that are formed on the rear face of the jaw 2. Supported by the legs 7 of the jaw 2 is a pin 11, said pin passing through the leaf springs 8, and supported by said legs 7 adjacent the extending ends thereof is a spacer member 12, having a pair of shoulders 13 formed thereon, the reducing ends 14 of said member 12 each passing through a leaf spring 8 and a leg 7, the shoulders 13 of said member bearing against respective leaf springs 8, and holding them firmly seated against the respective legs 7.

Mounted on the pin 11 and spacer member 12 are a plurality of string or twine retaining fingers 15, the outer fingers A each being engaged by a coil spring 16, one of which is mounted between each finger A and an adjacent leaf spring 8.

Formed on the extending end of each of the fingers A is a curved portion 17, and there being a curved portion 18 formed on the extending end of the fingers 15 which are designated as B, and located adjacent the fingers A. The fingers C one of which is mounted against one of the fingers B also have curved portions as designated at 19, whereas the centrally arranged finger 15, which is further designated as D has no curved portion, but extends beyond all of said other fingers A, B and C. It is to be noted that the fingers designated as A, B and C are arranged in sets, and are of different lengths, and the curved portions of each of said fingers form engaging mouths which are designated as E, F and G.

The leaf springs 8 have inclining extending portions 20 which are adapted to resiliently bear against the outer set of retaining fingers A adjacent their curved portions 17, whereas the coil springs 16 that are mounted on the spacer member 12 resiliently bear against said fingers A at their opposite ends, and since all of said plurality of retaining fingers 15 are slidably mounted on the pin 11 and spacer member 12, all of said fingers will normally abut each other on account of the spring pressure applied thereto from the leaf springs 8 and coil springs 16.

This improved twine holder is to be used mainly adjacent a bundle tying or untying department or bench, in which it is to be assumed the ledge 6 is above the bench and while the device serves as a twine holder, the use of the same also provides a saving of the twine, as the twine when engaged and retained by this improved holder is also in a position to be quickly grasped and the twine separated for immediate use.

The operation is as follows: When a length of twine is disengaged from a bundle, it is engaged by both hands of the operator in the positions as shown approximately by the arrows 21 in Fig. 2, in which the twine as designated as 22 is engaged in one of the mouths designated as E, F or G, and forced between a pair of abutting retaining fingers 15, and if desired, the twine can be moved in its vertical position as shown, to a point adjacent the spacer member 12. Other lengths of twine are engaged in like manner in any one of the mouths designated, and the lengths of twine when retained by the fingers will hang in approximate positions as designated at 23 in Fig. 2, as the lengths of twine in turn are engaged between abutting pairs of retaining fingers, the forcing of the twine therebetween will cause the extending ends 20 of the leaf springs 8 to be forced outwardly, but if the twine is moved farther toward the spacer member 12, the springs 8 will bear against and close the separated pair of fingers adjacent the extending ends thereof, whereas the coil springs 16 will be forced outwardly as the twine is moved thereadjacent.

It is therefore to be noted that from such an arrangement of retaining fingers that abut one another having a spring pressure adjacent each end, that a flexible resiliency is provided for the engaging fingers.

When it is desired to use the suspended twine for wrapping, the lower end of each twine length when engaged and pulled will readily be freed from between the pair of engaging fingers, in which it has been held, without disturbing adjacent lengths of twine. With such a construction it is to be noted that when the lengths of twine are mounted on the twine holder in the vertical position as shown and described, all of the hanging strands from the holder will be in order relative to using the twine over again, as against twine that is just thrown into a receptacle which will tangle.

Therefore, with a device of this improved character, which retains the lengths of twine in order, it is to be readily seen that the twine thus saved can be readily used over on account of the orderly way in which the depending ends of twine are kept relative to engaging the ends of the depending lengths.

What I claim is:

1. A twine holder comprising a plurality of relatively long abutting members, and means for applying a yielding resilient pressure to each of the outer arranged members.

2. A twine holder comprising a plurality of relatively long abutting members, and means for applying a yielding resilient pressure to each of the outer arranged members adjacent each end thereof located outwardly from said outer arranged members.

3. A twine holder comprising a body portion, a plurality of relatively long flat retaining fingers adapted to abut one another movably secured at one end to said body portion, said fingers being of different lengths, and each having an outwardly turned portion formed at one end, and independent means located adjacent each end of said fingers for applying resilient pressure thereto.

4. A twine holder comprising a body portion, a plurality of members supported at one end by said body portion, the supporting ends of said members being free to move relative to said body portion, and pressing means for tending to hold said members in abutting relation relative to one another.

5. A twine holder comprising a body portion, a plurality of members slidingly supported at one end to said body portion, and resilient means located adjacent said members for tending to hold said members in abutting relation to one another.

6. A twine holder comprising a body portion, a plurality of relatively long flat retaining fingers adapted to abut one another extending from said body portion and being of different lengths, a pair of guiding members supported by said body portion for slidingly sustaining said members relative to said body portion, and resilient means adapted to bear sidewise against one of the outer arranged members for tending to keep said members in their abutting relation.

JAMES D. FARMER.

Copies of this patent may be obtained for five cents each, by addressing the "Commissioner of Patents, Washington, D. C."